E. B. GRACE.
INTERCHANGEABLE SPROCKET.
APPLICATION FILED APR. 24, 1918.
1,360,930.
Patented Nov. 30, 1920.
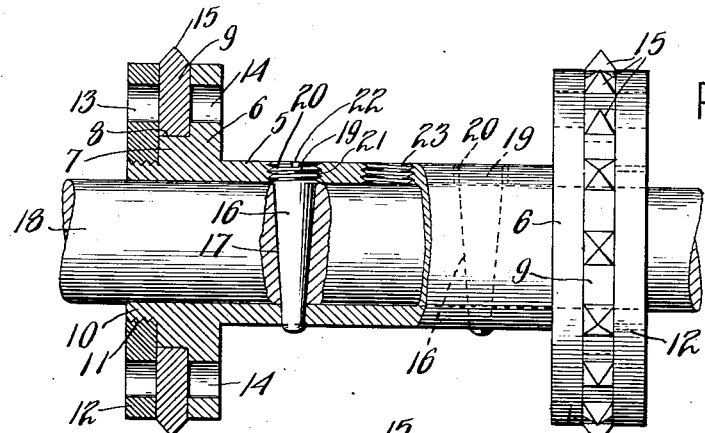
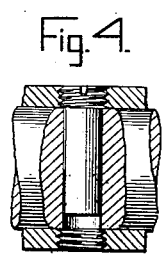
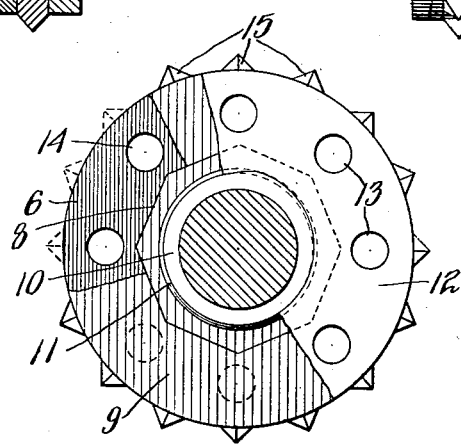
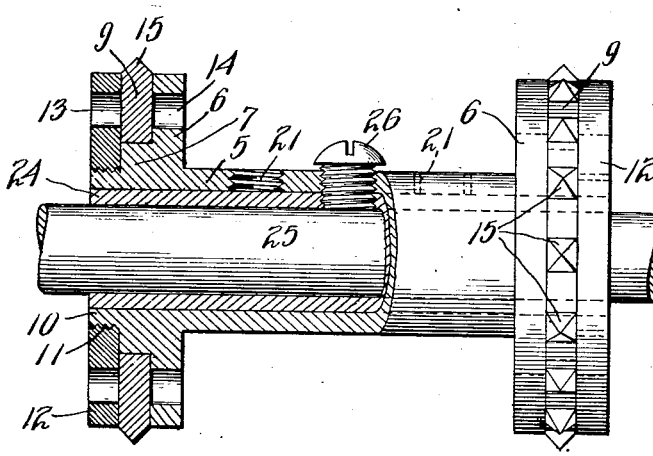
Inventor
Edwin B. Grace.
By Bradford & Doolittle
Attorneys

UNITED STATES PATENT OFFICE.

EDWIN B. GRACE, OF MEMPHIS, TENNESSEE.

INTERCHANGEABLE SPROCKET.

1,360,930. Specification of Letters Patent. Patented Nov. 30, 1920.

Application filed April 24, 1918. Serial No. 230,436.

*To all whom it may concern:*

Be it known that I, EDWIN B. GRACE, a citizen of the United States, residing at Memphis, Shelby county, and State of Tennessee, have invented and discovered certain new and useful Improvements in Interchangeable Sprockets, of which the following is a specification.

My said invention relates to sprocket wheels and means for mounting the same, particularly sprockets of the type used in film machines and consists in the combinations and arrangements of elements hereinafter described and particularly set forth in the accompanying claims.

The invention has for its purpose to provide a sprocket wheel, preferably of the duplex type, with a removable tooth carrying portion to the end that the same may be readily replaced when worn and thereby not require the discarding of the sprocket as a whole when only the teeth are defective.

The invention as disclosed herein is particularly applicable to moving picture machines, both projectors and cameras, and is shown by way of illustration in the accompanying drawings wherein:

Figure 1 is a part elevation and part sectional view of the duplex sprocket wheel, Fig. 2, a transverse sectional and partly elevational view thereof, Fig. 3, a view similar to Fig. 1, showing a modified form of the device for use on the feed or take-up shaft of a motion picture machine, and Fig. 4, a detail section showing a modified form of key.

Referring to the construction in further detail and wherein like reference characters designate corresponding parts in the different views shown, the sprocket consists of a sleeve portion 5 having integral end disk portions 6 and hub portions 7, said parts (5, 6 and 7) forming what is usually termed the spool. The hub portions are rabbeted as at 8, and the rabbeted portions are of polygonal design (see Fig. 2) to receive the toothed disk portions 9 that have central openings to readily fit thereon as shown. The extreme hub portions 10 are externally threaded as at 11 to receive the outer and clamping disks 12 that screw-thread thereon closely against the outer surfaces of said toothed disks as will be understood.

Each of the locking disks 12 is provided with a plurality of apertures 13 to receive the engaging elements of a spanner for applying or removing said disks. The provision of the several apertures 13 also serves to reduce the weight of the clamping members 12 and for a like reason the inner and integral disk portions 6 have openings 14.

The peripheries of the two disk members for each set of sprocket teeth 15 afford the necessary bearing surface for the film after the manner of the sprockets now used. And the construction of the sprocket teeth *per se* readily allows said teeth to engage with and disengage from the rows of apertures in the moving film without liability of tearing, or causing excessive wearing to any particular parts of the teeth.

To hold the sprocket in position on the shaft, tapered locking pins, or threaded keys, 16, are provided to fit within tapering apertures 17 which pass transversely through the shaft 18 as shown. Each of said keys has its larger end 19 provided with screw-threads 20 engaging with threaded apertures 21 formed in the hub sleeve portion 5, and a notch 22 serves to receive a screw driver for fastening or releasing said key. On some motion picture projectors but one pin is required to anchor the intermittent sprocket, and in such cases the combination pin and set screw may be applied to the center opening 23.

Referring to Fig. 3 a sleeve 24 is provided to take up the space between the spool or duplex sprocket and the shaft 25 in instances where said shaft is smaller than the bore of the sprocket as in the cases of the feed or take-up shaft of the machine. In brief the provision of the reducer sleeve 24 renders the device applicable to be fitted on any of the three shafts of the ordinary projecting or camera motion picture machine; *i. e.* the sprocket may apply to either the intermittent movement, the top feed, or the take-up feed of the machine. A screw bolt or stud 26 engages with the hub sleeve 5 and reducer sleeve 24 and secures these elements together and to the shaft 25 as shown.

It is proposed to construct the spool (5 and 6) and the retainer disks (12) of aluminum, and the interchangeable sprocket disks (9) together with the combination pins and set screws (16) of steel, but other materials may of course be used.

The provision of the combination pins and set screws for securing the sprocket permits the entire intermittent movement of a machine to be removed without disturbing the original position of the eccentric bushings and avoids the likelihood of springing the intermittent shaft. Thus by accomplishing such a result considerable time and money are saved which amply demonstrates the simplicity and utility of this type of fastening means. In brief, its provision enables the accomplishing of work by unskilled hands which heretofore could be done only by highly skilled labor.

Having thus fully described my said invention, what I claim as new and desire to secure by Letters Patent, is:

1. In a sprocket wheel, the combination of a hub having integral end disk portions, and polygonal hub portions formed on said disk portions, toothed disks having corresponding apertures fitted on said hub portions, said hub portions having threaded shoulders, and disks mounted on said shoulders, for locking the toothed disks to the end disk portions.

2. In a duplex sprocket wheel, the combination of a hub having rabbeted end portions and formed with integral disk portions, toothed disks removably fitted on such rabbeted hub portions, and disks screw-threaded on the hub and locking the toothed disks to the hub.

In witness whereof, I have hereunto set my hand and seal at Memphis, Tennessee, this 18th day of April, A. D. nineteen hundred and eighteen.

EDWIN B. GRACE. [L. S.]

Witnesses:
C. L. ROMAN,
JOHN W. FARLEY.